Patented Apr. 2, 1935

1,996,334

UNITED STATES PATENT OFFICE 1,996,334

SULPHONATED AND NEUTRALIZED HYDRO-CARBON SULPHUR COMPOUNDS

Eric T. Hessle, Lockport, Ill., assignor to Thiophene Products Company, Chicago, Ill., a corporation of Illinois No Drawing. Application September 21, 1929, Serial No. 394,395

6 Claims. (Cl. 260—53)

This invention relates to a product for pharmaceutical purposes comprising sulphonated and neutralized hydrocarbon sulphur compounds having therapeutical and cosmetical properties produced by the hereinafter described process.

In the production of the product, which is the subject matter of the invention herein set forth, I employ in part the process for the manufacture of cyclic sulphur compounds as set forth in my Patent No. 1,877,478, issued September 13, 1932.

The process employed in the manufacture of sulphonated and neutralized hydrocarbon sulphur compounds, which is the subject of the present invention, is as follows:

The first step of the said process consists in subjecting a crude oil to a distillation process. This crude oil must contain a rather large amount of unsaturated hydrocarbons and is usually of an asphaltic base.

This oil is distilled in the ordinary manner whereby kerosenes and gasolines contained in it, and also the heavy end residues, are removed. The remaining fractions are termed, for the purpose of the process "a first distillate".

The second step consists in treating the first distillate in a vacuum still according to the process set forth and described in my said Patent No. 1,877,478.

In this treatment the remaining fractions of the distillation constituting the first step, are placed in a vacuum still. As the reaction products formed in this vacuum still are highly corrosive to the still, vapor lines and condensers are preferably made of cast iron.

The oil is heated slowly in the presence of a catalytic agent. I have found that a very efficient catalyst for this purpose may be iron oxide, or the catalyst may also consist of an oxygen or hydroxyl combination of one of the metals of the group comprising chromium, manganese, iron, cobalt, nickel, or one of the alkaline earth metals.

The still containing the oil to be treated is first heated up without the application of a vacuum and maintained at a temperature around 200 degrees C. I then add very slowly to the contents of the still sulphur and iron oxide, preferably while agitating and at the same time constantly maintaining the temperature between 200 and 250 degrees C. The catalyst may now be removed from the still. The vacuum may then be slowly applied throughout the system until it reaches a high degree and is maintained during the remainder of the process. The fire is increased gradually and distillation is started. At the same time an inert gas, preferably superheated steam at approximately 300 degrees C., is slowly blown into the bottom of the still.

The first part of the distillation is accompanied by the formation of large amounts of hydrogen-sulphide gas, which is absorbed to a small extent by the lighter distillates, giving them a bad odor. This odor may be eliminated by heating these distillates or treating them with alkalis and subsequent washing. The heavier bodies do not possess an objectionable odor.

The sulphur compounds having cyclic structures with sulphur directly on the ring are not affected by this treatment and they will be found unchanged after reaction has taken place, but the mercaptans and hydrocarbon sulphides are converted into metal salts and the metal salts being unstable under heat are decomposed forming metal sulphides, and, at the same time, molecular sulphur is taken into the hydrocarbon molecule, forming to a great extent sulphur compounds of cyclic nature, such as thiophene or its derivatives.

Another reaction takes place as follows:

The molecular sulphur at a temperature of over 200 degrees C. has a tendency to form sulphides by entering into the hydrocarbon molecule on an unsaturated bond. These sulphides are not very stable, having to a great extent a tendency to form polymerization products, and finally being converted into heavy polymerized masses. However, in the presence of a metal oxide, metal salts are formed instantly and the polymerization is stopped. These metal salts react in the same manner as above described, forming thiophene or its derivatives. The product obtained from this step is termed, in this process, basic material.

The third step starts in delivering the basic material to a gauge pressure tank. This tank is provided with a visible gauge to control and regulate the amount of oil to be added to the sulphuric acid in a given amount of time. It is provided with a finely regulated needle valve. The basic material is then delivered gradually to an agitated sulphonator filled with fuming sulphuric acid 20% SO₃ and the temperature of the sulphonator during this operation must be kept very low. The best temperature is that of the freezing point of water. This is a very important requisite since the reaction in the agitator is exothermic and violent if not properly regulated and cooled. Approximately 300 gallons of sulphuric acid are used with 350 gallons of the basic material. The time required is about ten hours, after which the agitation is stopped and a separation is allowed to take place, which results in a stratification into two layers. The upper layer is a clear, undecomposed oil representing usually 50% by volume of the 350 gallons of the basic material used. The lower layer represents a black syrup containing a sulphonated product dissolved in an excess of concentrated sulphuric acid. During the sulphonation process sulphurous gases are formed and constantly drawn off.

The oil not reacted upon by the sulphuric acid is removed from this acid syrup. This oil lays on top of the black, sulphonated products. By leaving the light fractions boiling directly after the kerosene range in the first distillate an immediate and clean separation is effected in the fourth step. These light fractions do not enter into the formation of the final products of this invention to any great extent. They will be found in the top layer constituting the oil not acted upon by the sulphuric acid and are removed. They, however, dilute the heavier compounds of the saturated series, preventing thereby undesirable emulsions of these oils with the viscous sulphonated products.

In the fifth step of the process the acid syrup containing the sulphonated material in an excess of fuming sulphuric acid is transferred into an agitated tank. Petrolic ether is added while agitating after which stratification is allowed to take place. The petrolic ether layer is then removed and discarded. Petrolic ether extracts the excess of compounds having $-SO_3H$ groups which are not desirable to any great extent in the end product. The extracted acid syrup still contains a certain amount of compounds having $-SO_3H$ groups which are necessary to make the majority of water insoluble compounds contained in such syrup, water soluble. In addition to extracting the excess of compounds having $-SO_3H$ groups, the petrolic ether treatment effects removal of small portions of unreacted oil of the saturated series which did not separate in the 4th step of the process.

In the sixth step the sulfonated compounds, dissolved in an excess of sulphuric acid, which have been purified by the petrolic ether as described are passed into a lead-lined agitator having a conical bottom which is equipped with internal, acid-proof coils through which may be passed either steam or a refrigerating agent. The agitator is filled with distilled water, the amount of water being such that when mixed with the free acid contained in the sulphonation syrup a 30% diluted sulphuric acid is formed. As the mixture of water and acid results in heat the temperature is controlled by passing a refrigerant through the coils in the agitator. The flow of the sulphonation syrup into this tank is carefully guided. The dilution which is effected results in a precipitation of sulphonated compounds in a dough-like resinous form which stratifies and assumes a position on top of the diluted acid. Steam is now passed through the coils so as to keep the sulphonated products in a fluid state. The 30% diluted acid is run off leaving the sulphonated compounds carrying a 30% impurity of the 30% diluted sulphuric acid. Water is then added to dissolve the mass, after which heat is applied.

In the seventh step salt is added to the extent that a brine gravity of about 20 degrees Beaumé is obtained after the sulphonated compounds are precipitated on top of this brine solution. The salt water is now drawn off. To the precipitated sulphonated compounds a large amount of water is added and a solution effected while heating and agitating. Salt is again added to obtain a brine gravity approximately 20 degrees Beaumé. The purpose of the two salt treatments is to get the 30% of the 30% diluted sulphuric acid eliminated. Instead of dissolving the dough-like precipitate in water and adding salt afterwards, a salt brine of about 20 degrees Beaumé density can be added so as to effect a precipitation as above described.

In the eighth step benzene, ethyl-ether, chloroform or mixtures of these are added and the mixture heated up to 50 degrees C. In the case of ethyl-ether or a mixture of ethyl-ether with the others no heat should be applied unless working under pressure. These solvents will dissolve the sulphonated products. This salt brine is drawn off and leaves the sulphonated compounds in a practically pure state.

In the ninth step the acid number is taken and the necessary amount of alkali, such as sodium, potassium, or ammonium hydroxid, is added to gain a neutral product. This is done while agitating and cooling the mass.

In the tenth step the neutral mass is pumped into a glass-lined and agitated steam still. The solvents are removed by distillation. Water is added into the steam still, which water dissolves the sulphonated products while the organic solvents are being distilled off. The amount of water must be so regulated that the product remaining after distillation is composed of about 60% water and 40% of a mixture containing neutralized and sulphonated compounds. The whole mass is then pumped into an evaporator in order to evaporate the water to the desired degree. Another object of this procedure is to get rid of an ethereal oil which causes a bad odor of the finished product. This oil is carried away with water vapors. As soon as the right specific gravity is reached, which should be approximately 1.17, the evaporation is stopped. The mass is then agitated while being cooled to avoid the formation of lumps therein. When it is cooled down the dry residue will amount to approximately 55%. If it is desired to make a dry product, a vacuum dryer is employed, preferably of the drum type, which results in a very light, fluffy, powdered product having a yellow color. The vacuum dryer must be employed in drying the liquid product to powdered form because this product is a reducing agent and absorbs oxygen so readily when at elevated temperatures in the presence of air that it will start to oxidize and finally ignite. As the product is furthermore hydroscopic it should not be kept too long in open containers but packed in sealed cans directly after the drying operation.

I have found that these sulphonated and neutralized hydrocarbon sulphur compounds produced in the manner above described have very effective therapeutical and cosmetical properties. It has been found that these products will increase the number of arythrocythes in the blood stream and also the hemoglobin value per red blood-cell to and above normal. They have been found valuable in the reduction of pathogenic germs in the intestinal tract (called gram negative bacilli). Very beneficial results have been obtained in cases of cancer, and diabetes. They have been found beneficial in run-down or convalescent conditions for the purpose of regaining vitality, strength, and normal weight. Applied externally they have a wide and useful field in dermatology and gynæcology.

Having described my invention what I claim is:

1. A sulphonated heterocyclic hydrocarbon sulphur compound which compound can be produced by reacting molecular sulphur with a hydrocarbon oil containing straight chain sulphur in the presence of a catalyst consisting of one of the group of oxides and hydroxides of the metals chromium, manganese, iron, cobalt and nickel, distilling the products thus produced, sulphonating the distillate with fuming sulphuric acid in the cold, discarding the unreacted oil, adding water to effect separation into a sulphonated mass and an underlying layer of dilute sulphuric acid which acid layer is discarded, adding concentrated sodium chloride brine and benzol, thereby effecting a separation of the sulphonated mass dissolved in benzol and an underlying layer consisting of brine and excess sulphuric acid, which layer is discarded, neutralizing the benzol mixture and distilling off the benzol.

2. A sulphonated heterocyclic hydrocarbon sulphur compound which compound can be produced by reacting molecular sulphur with a hydrocarbon oil containing unsaturated hydrocarbons in the presence of a catalyst consisting of one of the group of oxides and hydroxides of the metals chromium, manganese, iron, cobalt and nickel, distilling the products thus formed, sulphonating the distillate with fuming sulphuric acid in the cold, discarding the unreacted oil, adding water to effect separation into a sulphonated mass and an underlying layer of dilute sulphuric acid which acid layer is discarded, adding concentrated sodium chloride brine and benzol, thereby effecting a separation of the sulphonated mass dissolved in benzol and an underlying layer consisting of brine and excess sulphuric acid, which layer is discarded, neutralizing the benzol mixture and distilling off the benzol.

3. A sulphonated heterocyclic hydrocarbon sulphur compound which compound can be produced by reacting molecular sulphur with a hydrocarbon oil containing straight chain sulphur and unsaturated hydrocarbons in the presence of a catalyst consisting of one of the group of oxides and hydroxides of the metals chromium, manganese, iron, cobalt and nickel, distilling the products thus formed, sulphonating the distillate with fuming sulphuric acid in the cold, discarding the unreacted oil, adding water to effect separation into a sulphonated mass and an underlying layer of dilute sulphuric acid which acid layer is discarded, adding concentrated sodium chloride brine and benzol, thereby effecting a separation of the sulphonated mass dissolved in benzol and an underlying layer consisting of brine and excess sulphuric acid, which layer is discarded, neutralizing the benzol mixture and distilling off the benzol.

4. A sulphonated heterocyclic hydrocarbon sulphur compound which compound can be produced by reacting molecular sulphur with a hydrocarbon oil in the presence of a catalyst consisting of one of the group of oxides and hydroxides of the metals chromium, manganese, iron, cobalt and nickel, distilling the products thus formed, sulphonating the distillate with fuming sulphuric acid in the cold, discarding the unreacted oil, adding water to effect separation into a sulphonated mass and an underlying layer of dilute sulphuric acid which acid layer is discarded, adding concentrated sodium chloride brine and benzol, thereby effecting a separation of the sulphonated mass dissolved in benzol and an underlying layer consisting of brine and excess sulphuric acid, which layer is discarded, neutralizing the benzol mixture and distilling off the benzol.

5. A sulphonated heterocyclic hydrocarbon sulphur compound which compound can be produced by reacting molecular sulphur with a hydrocarbon oil in the presence of a catalyst consisting of one of the group of oxides and hydroxides of the metals chromium, manganese, iron, cobalt and nickel, distilling the products thus formed in the presence of an inert gas, sulphonating the distillate with fuming sulphuric acid in the cold, adding water to effect separation into a sulphonated mass and an underlying layer of dilute sulphuric acid which acid layer is discarded, adding concentrated sodium chloride brine and benzol, thereby effecting a separation of the sulphonated mass dissolved in benzol and an underlying layer consisting of brine and excess sulphuric acid, which layer is discarded, neutralizing the benzol mixture and distilling off the benzol.

6. A sulphonated heterocyclic hydrocarbon sulphur compound which compound can be produced by reacting molecular sulphur with hydrocarbon oil in the presence of a catalyst consisting of one of the group of oxides and hydroxides of the metals chromium, manganese, iron, cobalt and nickel, distilling the products thus formed in the presence of an inert gas and a vacuum, sulphonating the distillate with fuming sulphuric acid in the cold, discarding the unreacted oil, adding water to effect separation into a sulphonated mass and an underlying layer of dilute sulphuric acid which acid layer is discarded, adding concentrated sodium chloride brine and benzol, thereby effecting a separation of the sulphonated mass dissolved in benzol and an underlying layer consisting of brine and excess sulphuric acid, which layer is discarded, neutralizing the benzol mixture and distilling off the benzol.

ERIC T. HESSLE.